US008736772B2

(12) United States Patent
Takizawa et al.

(10) Patent No.: US 8,736,772 B2
(45) Date of Patent: May 27, 2014

(54) INFORMATION PROCESSING APPARATUS AND INFORMATION PROCESSING METHOD

(75) Inventors: Shuichi Takizawa, Chiba (JP); Takayoshi Yamasaki, Tokyo (JP); Naoki Hasegawa, Kanagawa (JP); Norihiro Nagai, Kanagawa (JP)

(73) Assignee: Sony Corporation (JP)

( * ) Notice: Subject to any disclaimer, the term of this patent is extended or adjusted under 35 U.S.C. 154(b) by 106 days.

(21) Appl. No.: 13/105,166

(22) Filed: May 11, 2011

(65) Prior Publication Data
US 2011/0285920 A1 Nov. 24, 2011

(30) Foreign Application Priority Data
May 19, 2010 (JP) ................................ P2010-115836

(51) Int. Cl.
*H04N 5/44* (2011.01)
(52) U.S. Cl.
CPC .................................. *H04N 5/4403* (2013.01)
USPC .......................................... 348/734; 348/725
(58) Field of Classification Search
CPC ................................................... H04N 5/4403
USPC ......................................................... 348/734
See application file for complete search history.

(56) References Cited

U.S. PATENT DOCUMENTS

| | | | | |
|---|---|---|---|---|
| 2004/0266419 | A1* | 12/2004 | Arling et al. | ................... 455/420 |
| 2006/0161865 | A1* | 7/2006 | Scott et al. | ...................... 715/810 |
| 2007/0052547 | A1 | 3/2007 | Haughawout et al. | |
| 2007/0176787 | A1* | 8/2007 | Iten et al. | ................... 340/825.69 |
| 2008/0088495 | A1 | 4/2008 | Kawakita | |
| 2008/0136972 | A1* | 6/2008 | Blankenburg | ................... 348/734 |
| 2008/0225184 | A1 | 9/2008 | Hardacker et al. | |
| 2009/0184161 | A1* | 7/2009 | Ueno et al. | ..................... 235/380 |
| 2010/0013998 | A1 | 1/2010 | Mortensen | |
| 2010/0079682 | A1 | 4/2010 | Martch | |
| 2011/0018754 | A1* | 1/2011 | Tojima et al. | .................. 341/176 |

FOREIGN PATENT DOCUMENTS

JP 2010-011324 A 1/2010

OTHER PUBLICATIONS

European Search Report EP 11164802, dated Sep. 1, 2011.

* cited by examiner

*Primary Examiner* — Jefferey Harold
*Assistant Examiner* — Justin Sanders
(74) *Attorney, Agent, or Firm* — Lerner, David, Littenberg, Krumholz & Mentlik, LLP

(57) ABSTRACT

An information processing apparatus includes an information processing apparatus main body and a remote controller capable of controlling the information processing apparatus main body. The information processing apparatus main body includes a connection unit capable of being connected with an electronic apparatus, a first storage unit to store model identification information, and a control unit to perform control so that display information of a model selection screen for causing a user to select a model of the electronic apparatus with the remote controller is supplied to the electronic apparatus, the model is determined, and model identification information corresponding to the model is transmitted to the remote controller. The remote controller includes a plurality of keys, a transmission unit, a second storage unit to store a list of control codes assigned to the plurality of keys, and an assignment unit to assign the control codes to the plurality of keys.

6 Claims, 12 Drawing Sheets

INFORMATION PROCESSING APPARATUS AND INFORMATION PROCESSING METHOD

CROSS-REFERENCE TO RELATED APPLICATION

The present application claims priority from Japanese Patent Application No. JP 2010-115836 filed in the Japanese Patent Office on May 19, 2010, the entire content of which is incorporated herein by reference.

BACKGROUND OF THE INVENTION

1. Field of the Invention

The present invention relates to an information processing apparatus which is connected with AV (audio visual) equipment such as a television apparatus and supplies an AV signal to the AV equipment, and to an information processing method.

2. Description of the Related Art

In recent years, most of various household electric appliances such as a recording and reproducing apparatus and a television apparatus can be subjected to remote control with a supplied remote controller. Further, there is known a remote controller which is capable of operating a plurality of electronic apparatuses by itself.

On the other hand, there is also known a so-called general-purpose remote controller which deals with remote control of AV equipment (such as a television apparatus) of various manufacturers and model numbers. In order to deal with the AV equipment of various manufacturers and model numbers, the general-purpose remote controller associates model identification information corresponding to a plurality of manufacturers and model numbers and a control code list with each other and stores the associated information and list in a storage unit provided therein. When a user performs a predetermined key operation of a remote controller to input the model identification information corresponding to the manufacturer and model number of AV equipment to be controlled, a general-purpose remote controller assigns control codes to the keys on the basis of the control code list associated with the model identification information which has been input. Thus, by using the remote controller, it is possible to perform remote control of the AV equipment (see, for example, Japanese Patent Application Laid-open No. 2010-11324).

SUMMARY OF THE INVENTION

In recent years, it is being studied that the remote control of AV equipment is performed by using a remote controller supplied to an information processing apparatus main body such as a BD (Blu-ray disc (registered trademark)) player and a DVD (digital versatile disc) player which is connected with the AV equipment such as a television apparatus and supplies an AV signal to the AV equipment. In this case, it is necessary to add a setting for the remote control of the AV equipment to the supplied remote controller as in the case of assigning the control codes to the keys of the general-purpose remote controller described above.

In view of the above-mentioned circumstances, it is desirable to provide an information processing apparatus and an information processing method which are capable of easily performing an operation for the setting of the remote control of the AV equipment connected to the information processing apparatus main body.

According to an embodiment of the present invention, there is provided an information processing apparatus including an information processing apparatus main body and a remote controller configured to be capable of controlling the information processing apparatus main body by communicating with the information processing apparatus main body.

The information processing apparatus main body is configured to include a connection unit, a first storage unit, and a control unit.

The remote controller is configured to include a plurality of keys, a transmission unit, a second storage unit, and an assignment unit.

The connection unit is capable of being connected with an electronic apparatus having a screen through a transmission line of a signal.

The first storage unit stores in advance a plurality of pieces of model identification information for identifying models of the electronic apparatus capable of being connected with the connection unit.

The control unit performs control so that display information of a model selection screen for causing a user to select a model of the electronic apparatus by using the remote controller is supplied to the electronic apparatus which is connected to the connection unit, the model selected by the user is determined based on a transmission signal from the remote controller, and model identification information corresponding to the model determined is transmitted to the remote controller.

The transmission unit is capable of transmitting a radio signal for controlling the electronic apparatus in accordance with an operation of the plurality of keys.

The second storage unit stores a list of control codes assigned to the plurality of keys, respectively, for each model indicated by the plurality of pieces of model identification information stored in the first storage unit of the information processing apparatus main body, and The assignment unit receives the model identification information transmitted from the information processing apparatus main body, reads the list of the control codes corresponding to the model indicated by the received model identification information from the second storage unit, and assigns the control codes to the plurality of keys, respectively.

With this structure, by using the remote controller for controlling the information processing apparatus main body, it is possible to perform remote control of the electronic apparatus connected to the information processing apparatus main body. In addition, the model selection screen for leading the user to perform the operation for setting of the remote control is displayed on the electronic apparatus, so the user can input the model by referring the model selection screen, and can easily perform the operation for the setting of the remote control.

The display information of the model selection screen includes information about an operation method for causing the user to select the model of the electronic apparatus by using the remote controller.

As a result, the operation method of the remote controller for leading the user to select the model of the electronic apparatus is displayed on the electronic apparatus, so the user can more easily input the model while referring to the operation method.

The remote controller is configured to further include a completion notification unit to notify the information processing apparatus main body of a completion of the assignment of the control codes to the plurality of keys.

The control unit of the information processing apparatus main body supplies, upon reception of the notification, display information of an assignment check screen for urging the user to use a test method of assigning the control codes to the plurality of keys to the electronic apparatus connected to the connection unit.

As a result, the assignment check screen for urging the user to use the test method of the assignment is displayed on the electronic apparatus, so the user can perform the operation for checking the completion of the assignment by using the remote controller while referring to the assignment check screen.

According to another embodiment of the present invention, there is provided an information processing method used by an information processing apparatus including an information processing apparatus main body including a connection unit capable of being connected with an electronic apparatus having a screen through a transmission line of a signal, and a first storage unit to store in advance a plurality of pieces of model identification information for identifying models of the electronic apparatus capable of being connected with the connection unit, and a remote controller capable of controlling the information processing apparatus main body by communicating with the information processing apparatus main body, the remote controller including a plurality of keys, a transmission unit capable of transmitting a radio signal for controlling the electronic apparatus in accordance with an operation of the plurality of keys, and a second storage unit to store a list of control codes assigned to the plurality of keys, respectively, for each model indicated by the plurality of pieces of model identification information stored in the first storage unit of the information processing apparatus main body.

By the information processing apparatus main body, display information of a model selection screen for causing a user to select a model of the electronic apparatus by using the remote controller is supplied to the electronic apparatus which is connected to the connection unit, the model selected by the user is determined based on a transmission signal from the remote controller, and model identification information corresponding to the model determined is transmitted to the remote controller by the information processing apparatus main body.

By the remote controller, the model identification information transmitted from the information processing apparatus main body is received, the list of the control codes corresponding to the model indicated by the received model identification information is read from the second storage unit, and the control codes is assigned to the plurality of keys, respectively.

The display information of the model selection screen includes information about an operation method for causing the user to select the model of the electronic apparatus by using the remote controller.

The information processing apparatus main body is notified of a completion of the assignment of the control codes to the plurality of keys by the remote controller.

Upon reception of the notification, display information of an assignment check screen for urging the user to use a test method of assigning the control codes to the plurality of keys is supplied to the electronic apparatus connected to the connection unit by the information processing apparatus main body.

According to the embodiments of the present invention, it is possible to easily perform the operation for the setting of the remote control of AV equipment connected to the information processing apparatus main body.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

(Structure of Information Processing Apparatus)

Figure 1:
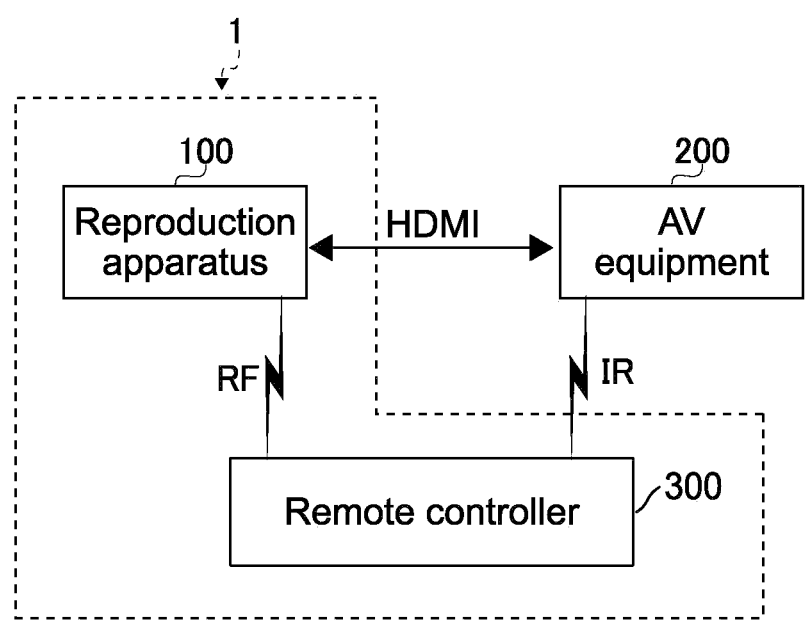
FIG. 1 is a diagram showing an information processing apparatus according to an embodiment of the present invention.

FIG. 1 is a diagram showing an information processing apparatus according to an embodiment of the present invention.

An information processing apparatus 1 includes a reproduction apparatus 100 (information processing apparatus main body) and a remote controller 300. To the reproduction apparatus 100, an AV (audio visual) equipment 200 is connected through an interface for data transmission.

The reproduction apparatus 100 is capable of reproducing a video content and an audio content that are recorded in a recording medium such as a BD (Blu-ray disc (registered trademark)) and a DVD (digital versatile disc). The reproduction apparatus 100 may be a recording and reproduction apparatus having a recording function.

The AV equipment 200 is equipment which is connected with the reproduction apparatus 100 through an interface for data transmission. As the interface for data transmission, an HDMI (high-definition multimedia interface) system is used, for example. The AV equipment 200 is, for example, a television apparatus, and is capable of receiving broadcast waves of a content and performing reproduction, and capable of outputting a video signal and an audio signal which are supplied from the reproduction apparatus 100 through the interface for data transmission.

The remote controller 300 is a remote controller supplied to the reproduction apparatus 100. The remote controller 300 can perform bidirectional wireless communication with the reproduction apparatus 100 with the use of an RF (radio frequency) signal. The remote controller 300 can remotely control the reproduction apparatus 100 with the use of an RF (radio frequency) signal, and performs IR (infrared) communication, thereby making it possible to remotely control the AV equipment 200 that is connected to the reproduction apparatus 100 through the interface for data transmission.

(Hardware Structure of Reproduction Apparatus)

Next, the hardware structure of the reproduction apparatus 100 will be described.

Figure 2:
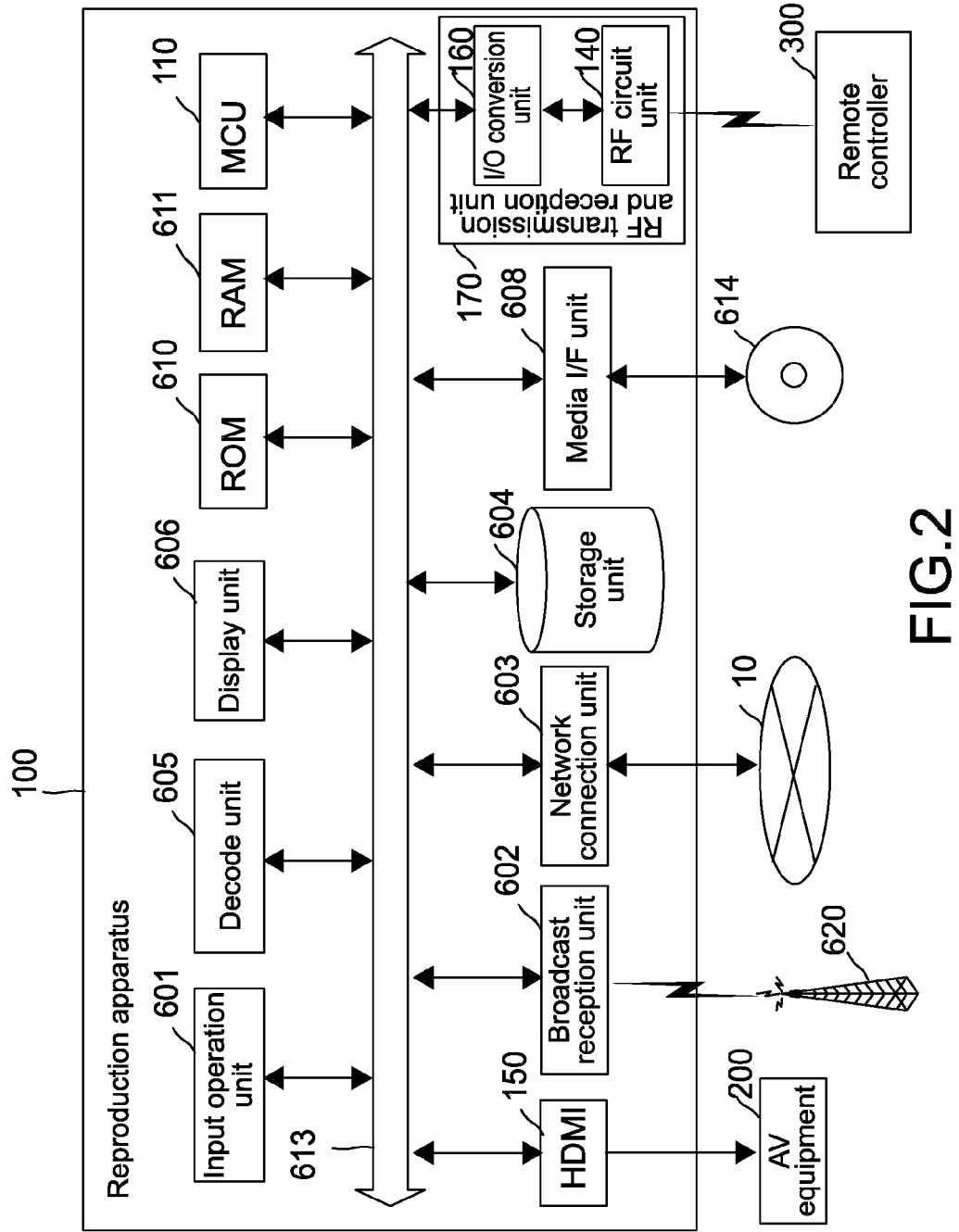
FIG. 2 is a block diagram showing the hardware structure of a reproduction apparatus.

FIG. 2 is a block diagram showing the hardware structure of the reproduction apparatus 100.

In the reproduction apparatus 100, to an MCU (micro control unit) 110, an input operation unit 601, a broadcast reception unit 602, a network connection unit 603, a storage unit 604, a decode unit 605, a display unit 606, an HDMI connection unit 150, a media interface unit 608, an RF transmission and reception unit 170, and a ROM (read only memory) 610, and a RAM (random access memory) 611 are connected via a system bus 613.

The input operation unit 601 is provided with various keys or the like. A user uses the input operation unit 601 to input various commands or data. The various commands that has been input from the input operation unit 601 by the user are supplied to the MCU 110 via the system bus 613.

The broadcast reception unit 602 receives a transport stream distributed from each broadcast station 620, such as terrestrial digital TV broadcasting, CS digital broadcasting, and BS digital broadcasting.

The network connection unit 603 processes the connection with an Internet 10.

The storage unit 604 is formed of a large-volume recording medium such as an HDD (hard disc drive) and an SSD (solid state drive), and a broadcast content or the like received by the broadcast reception unit 602 is recorded thereto.

The decode unit 605 decodes data of a content which is read from the recording unit 604 and reconstruct digital video data and digital audio data. The digital video data and digital audio data reconstructed are supplied to the HDMI connection unit 150 via the system bus 613.

The display unit 606 is constituted of a display provided with a display screen such as an LCD (liquid crystal display), a display control circuit for driving the display, and the like. The display unit 606 displays various statuses, verification of the command or data input by the user, or the like.

To the HDMI connection unit 150, the AV equipment 200 can be connected. The HDMI connection unit 150 inputs and outputs the video signal and the audio signal to and from the AV equipment 200 connected thereto.

To the media interface unit 608, a removable medium 614 such as an optical disc can be attached. In the removable medium 614, data of a broadcast content can be recorded, for example. As the removable medium 614, a write-once DVD, a rewritable DVD, a Blu-ray disc, or the like is used.

The RF transmission and reception unit 170 is an interface for processing bidirectional communication with the remote controller 300 with the use of the RF signal with an antenna. The RF transmission and reception unit 170 has an RF circuit unit 140 and an I/O (input/output) conversion unit 160. The RF circuit unit 140 performs the processing of the RF signal. The I/O conversion unit 160 demodulates a reception RF signal supplied from the RF circuit unit 140, generates the reception data, and modulates a transmission RF signal from data for transmission, for example.

The ROM 610 is a read-only memory in which programs, data, and the like for software processing that should be executed by the reproduction apparatus 100 are permanently stored. It should be noted that the programs may be stored in the storage unit 604.

The RAM 611 is a writable volatile memory which is used to load a program code executed by the MCU 110 or write work data of a program.

The MCU 110 performs overall control of units of the reproduction apparatus 100 and performs control of exchange of data between the units. The MCU 110 performs overall control of the units described above and performs control of exchange of data between the units. In order to execute the software processing that should be executed by the reproduction apparatus 100, the MCU 110 loads a necessary program from the ROM 610 to the RAM 611 and interprets and executes the program.

As described above, the reproduction apparatus 100 is structured by using the typical computer hardware. The programs stored in the ROM 610 cause the computer hardware of the reproduction apparatus 100 to function as units shown in FIG. 5.

(Hardware Structure of Remote Controller)

Next, the hardware structure of the remote controller 300 will be described.

Figure 3:
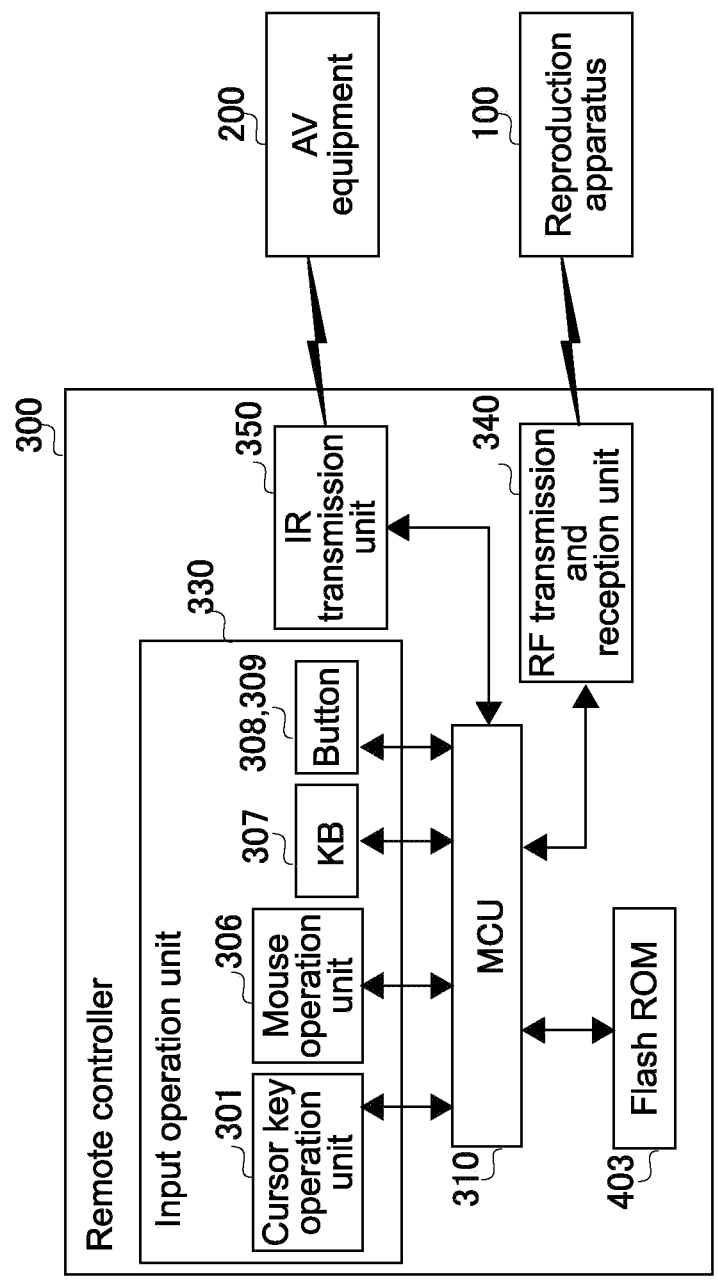
FIG. 3 is a block diagram showing the hardware structure of a remote controller.

FIG. 3 is a block diagram showing the hardware structure of the remote controller 300.

The remote controller 300 has an MCU (micro control unit) 310, an RF transmission and reception unit 340, a flash ROM 403, an input operation unit 330, and an IR transmission unit 350. The remote controller 300 is driven by a battery (not shown).

The RF transmission and reception unit 340 performs bidirectional transmission and reception of an RF signal with the reproduction apparatus 100.

The input operation unit 330 is constituted of a plurality of keys and outputs signals corresponding to the respective keys to the MCU 310.

The flash ROM 403 is a read-only memory in which programs, data, and the like for software processing that should be executed by the remote controller 300 are permanently stored.

IR transmission unit 350 transmits an IR signal for remote control to the AV equipment 200.

Here, the input operation unit 330 will be described in more detail.

Figure 4:
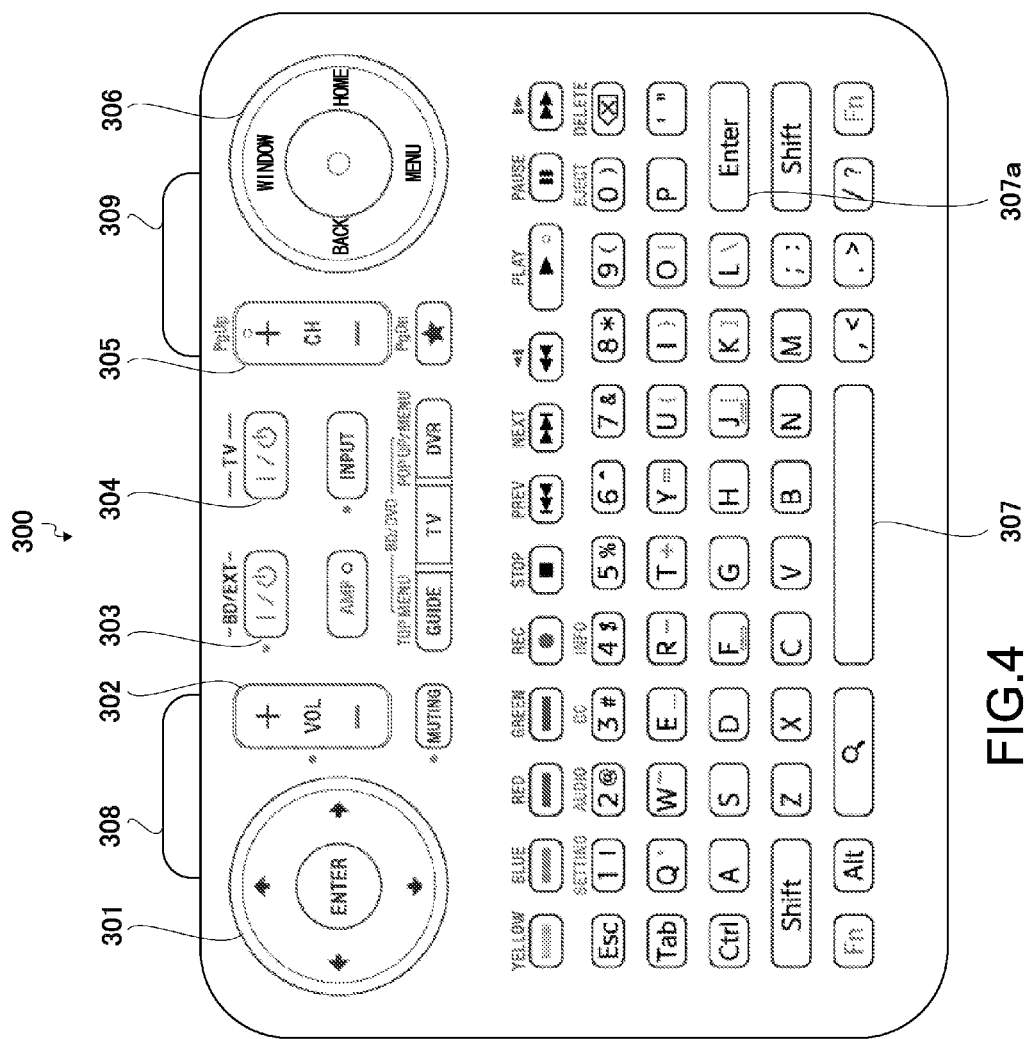
FIG. 4 is a plan view showing the layout of various key buttons of an input operation unit.

FIG. 4 is a plan view showing the layout of various key buttons of the input operation unit 330.

The input operation unit 330 includes a cursor key operation unit 301, a volume key 302, a reproduction apparatus power key 303, an AV equipment power key 304, a channel key 305, a mouse operation unit 306, a keyboard unit 307, a scrolling button 308, a zoom button 309, and the like. With the use of those keys 301 to 309, a command is input to the remote controller 300 by the user.

The cursor key operation unit 301 has a cursor key in up, down, right, and left directions and an enter key provided in the center thereof. The cursor key operation unit 301 is used to shift the focus for visualizing an object in a selection candidate state brought by the user on a menu screen displayed on the AV equipment 200, by the number of objects corresponding to the number of presses in the direction indicated by the cursor key.

The volume key 302 is used to adjust the volume of the audio content reproduced by the reproduction apparatus 100 or the audio content reproduced by the AV equipment 200.

The reproduction apparatus power key 303 is used to turn on and off the power of the reproduction apparatus 100.

The AV equipment power key 304 is used to turn on and off the power of the AV equipment 200.

The channel key 305 is used to select a broadcast station as a supply source of the broadcast waves received by the AV equipment 200.

The mouse operation unit 306 is an optical mouse operation unit. When the user slides the finger placed thereon or taps the mouse operation unit with the finger, a command is input to the remote controller 300 from the user. The mouse operation unit 306 has a window key, a home key, a menu key, and a back key. The user taps the key with the finger placed thereon, thereby displaying a screen corresponding to the command. The mouse operation unit 306 is generally used when a web page is viewed via the Internet 10.

The keyboard unit 307 is used to input a character string or used to perform a predetermined function by pressing a function key and a predetermined character key at the same time. An enter key 307a of the keyboard unit 307 is used to determine a predetermined operation.

The scrolling button 308 is used to perform scrolling display of the display screen displayed on the AV equipment 200. For example, the user slides the finger placed on the mouse operation unit 306 in a predetermined direction while pressing the scrolling button 308, thereby achieving the scrolling display of the display screen displayed on the AV equipment 200.

The zoom button 309 is used to zoom the display screen displayed on the AV equipment 200. For example, the user slides the finger placed on the mouse operation unit 306 in a predetermined direction while pressing the zoom button 309, thereby zooming the display screen displayed on the AV equipment 200.

As described above, the remote controller 300 has not only the keys (reproduction apparatus power key 303 and the like) for the remote control of the reproduction apparatus 100 but also keys (AV equipment power key 304 and the like) for the remote control of the AV equipment 200 connected to the reproduction apparatus 100. In addition, the remote controller 300 has keys (mouse operation unit 306 and the like) for the operation for viewing a web page via the Internet 10 to which the reproduction apparatus 100 is connected.

(Hardware Structure of AV Equipment)

The detailed description about the hardware structure of the AV equipment 200 will be omitted. The AV equipment 200 has minimal hardware components, such as a broadcast reception unit, a controller, a nonvolatile memory, a main memory, an input operation unit, a display screen, an audio output unit, an HDMI connection unit, and an IR reception unit, in order to function as the AV equipment for displaying an image content reproduced by the reproduction apparatus 100.

(Functional Structure of Reproduction Apparatus)

Next, a description will be given on the functional structure of the reproduction apparatus 100.

Figure 5:
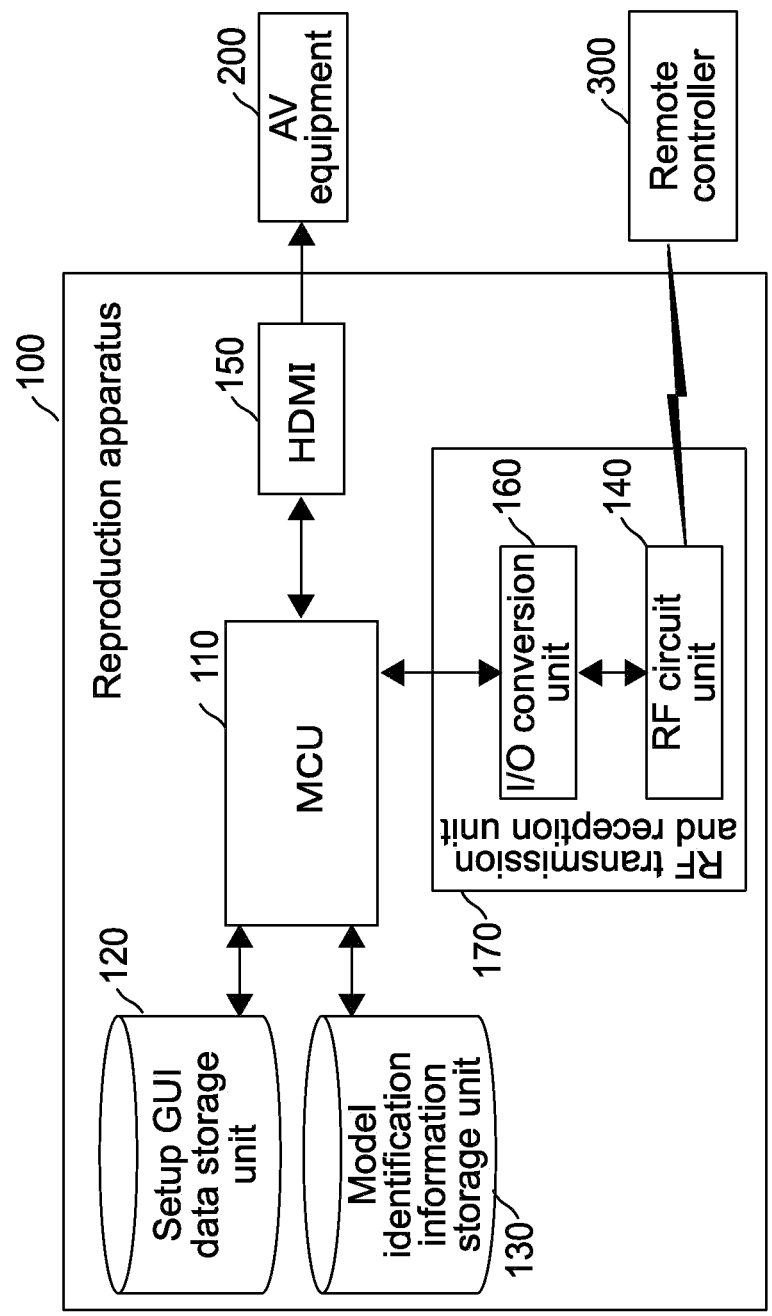
FIG. 5 is a block diagram showing the functional structure of the reproduction apparatus.

FIG. 5 is a block diagram showing the functional structure of the reproduction apparatus.

The reproduction apparatus 100 includes the MCU 110, a setup GUI (graphical user interface) screen data storage unit 120, a model identification information storage unit 130 (first storage unit), the RF transmission and reception unit 170, and the HDMI (high-definition multimedia interface) connection unit 150.

When the MCU 110 receives a setup start signal which is transmitted from the remove controller 300 which has been subjected to a predetermined input operation from the user, the MCU 110 reads setup GUI data stored in the setup GUI data storage unit 120, supplies the data to the AV equipment 200 through the HDMI connection unit 150, and then displays a setup GUI screen on the AV equipment 200. Further, on the basis of a transmission signal from the remote controller 300 that has been subjected to the predetermined input operation from the user, the MCU 110 determines the model of the AV equipment 200 selected by the user and transmits the model identification information corresponding to the model number determined to the remote controller 300 through the RF transmission and reception unit 170, for example.

The setup GUI data storage unit 120 stores various pieces of setup GUI data displayed on the display screen of the AV equipment 200 at the time of the setup of the remote controller 300.

The model identification information storage unit 130 associates the model numbers of all the AV equipment capable of being selected as setup targets of the remote controller 300, that is, capable of being connected to the HDMI connection unit 150, the names of manufacturers of the AV equipment, and the model identification information for uniquely indicating the AV equipment represented by the names of manufacturers and the model numbers with one another, and stores those therein.

It should be noted that the setup GUI data storage unit 120 and the model identification information storage unit 130 are provided to, for example, a read and write storage apparatus such as an HDD and an SSD.

(Functional Structure of Remote Controller)

Next, the functional structure of the remote controller 300 will be described.

Figure 6:
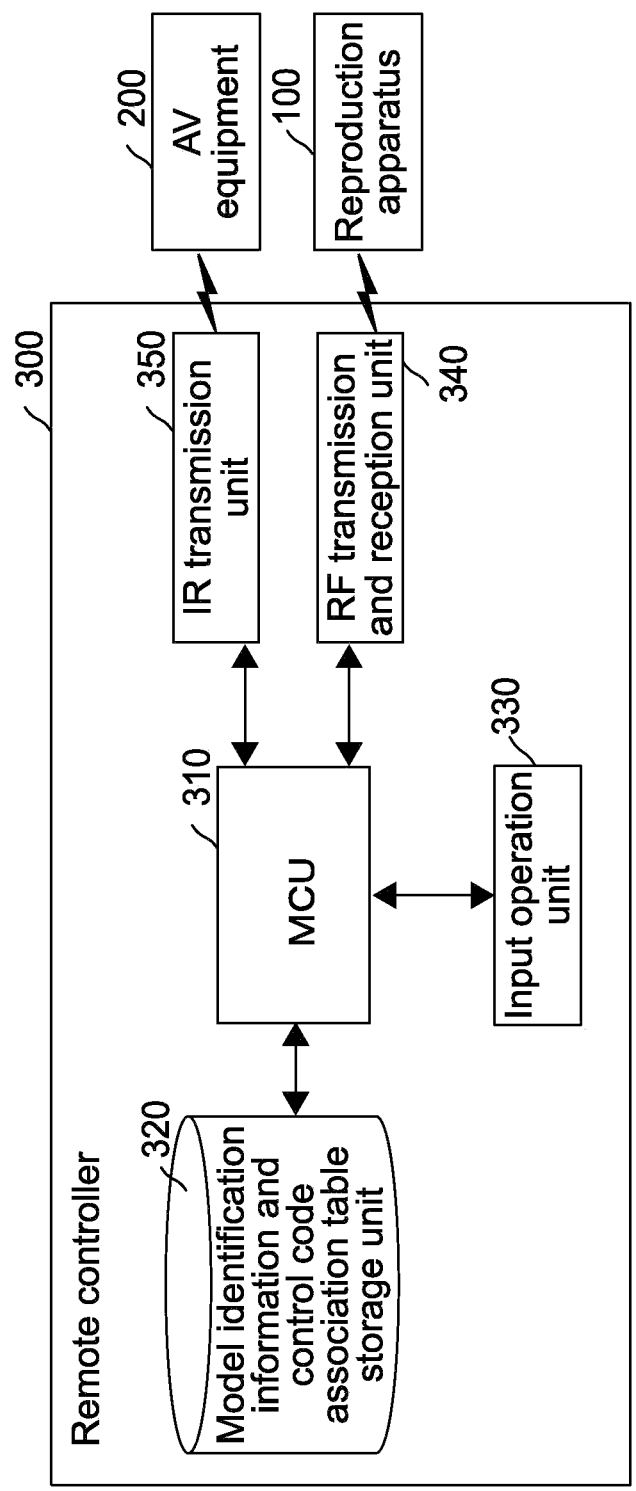
FIG. 6 is a block diagram showing the functional structure of the reproduction apparatus.

FIG. 6 is a block diagram showing the functional structure of the remote controller 300.

The remote controller 300 includes the MCU 310 (assignment unit), a model identification information and control code association table storage unit 320 (second storage unit), the input operation unit 330, the RF transmission and reception unit 340, and the IR transmission unit 350.

The MCU 310 receives model identification information for which a selection flag is set from the reproduction apparatus 100 through the RF transmission and reception unit 340, reads a control code list which is associated with the model identification information from the model identification information and control code association table storage unit 320, and assigns the control codes to the keys of the input operation unit 330 on the basis of the read control code list, for example. Here, the operation for assigning the control codes is referred to as a "setup operation" of the AV equipment 200 in the remote controller 300.

The model identification information and control code association table storage unit 320 is a part of all the AV equipment capable of being selected as the setup targets of the remote controller 300 stored in the model identification information storage unit 130 of the reproduction apparatus 100, and in the part, the model identification information and the control code list are associated with each other and stored. In this case, the control code list refers to the association table of the keys of the input operation unit 330 and the codes transmitted to the AV equipment by operating the keys.

It should be noted that the model identification information and control code association table storage unit 320 is provided to, for example, read and write storage apparatus such as a flash ROM.

(Operations of Reproduction Apparatus and Remote Controller)

Next, the operations of the reproduction apparatus 100 and the remote controller 300 will be described.

First, the setup operation of the remote controller 300 will be described, and then a setup completion check operation will be described.

(Setup Operation of Remote Controller)

Figure 7:
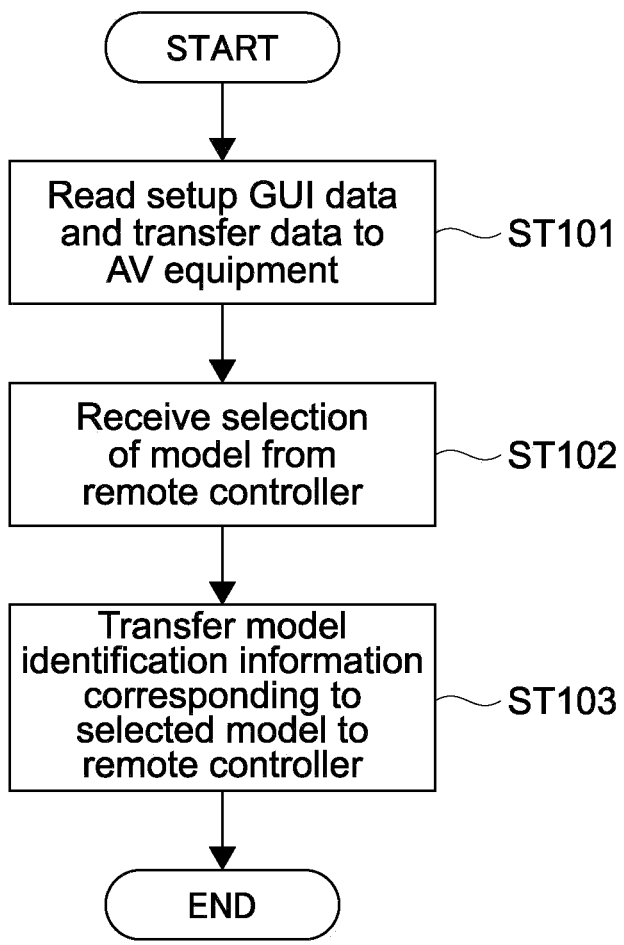
FIG. 7 is a flowchart showing a setup operation of the remote controller on the side of the reproduction apparatus.

FIG. 7 is a flowchart showing the setup operation of the remote controller on the side of the reproduction apparatus.

When the MCU 110 of the reproduction apparatus 100 receives a setup start signal which is transmitted from the remote controller 300 in response to a predetermined input operation from the user, the MCU 110 reads setup GUI data from the setup GUI data storage unit 120, supplies the setup GUI data to the AV equipment 200 through the HDMI connection unit 150, and displays the setup GUI screen on the AV equipment 200 (Step ST101). While referring to the setup GUI screen displayed on the AV equipment, the user operates a specific key of the remote controller 300, thereby selecting AV equipment 200 connected. The MCU 310 of the remote controller 300 transmits the selection information of the AV equipment 200 as an RF signal with the use of the RF transmission and reception unit 340. On the other hand, the MCU 110 of the reproduction apparatus 100 receives the selection information of the AV equipment 200 from the remote controller 300 through the RF transmission and reception unit 170. The MCU 110 determines the model of the AV equipment 200 selected by the user on the basis of the selection information (Step ST102), and the model identification information corresponding to the model thus determined is read from the model identification information storage unit 130 and is transmitted to the remote controller 300 through the RF transmission and reception unit 170 (Step ST103).

Figure 8:
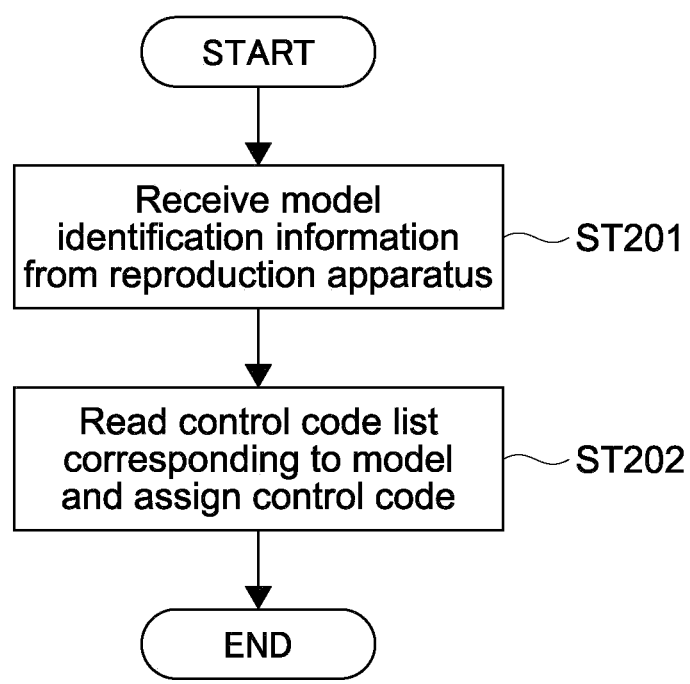
FIG. 8 is a flowchart showing a setup operation of the remote controller on the side of the remote controller.

FIG. 8 is a flowchart showing the setup operation of the remote controller on the side of the remote controller.

When receiving the model identification information from the reproduction apparatus 100 through the RF transmission and reception unit 340 (Step ST201), the MCU 310 of the remote controller 300 reads the control code list corresponding to the model identification information from the model identification information and control code association table storage unit 320. The MCU 310 assigns the control codes to the keys of the input operation unit 330 on the basis of the read control code list (Step ST202).

Hereinafter, Steps ST101 to ST103 and Steps ST201 to ST202 will be described in detail.

When the MCU 110 of the reproduction apparatus 100 receives the setup start signal transmitted from the remote controller 300 that has been subjected to the predetermined input operation from the user, the MCU 110 reads equipment manufacturer selection GUI data from the setup GUI data storage unit 120 and supplies the data to the AV equipment 200 through the HDMI connection unit 150, thereby displaying the equipment manufacturer selection GUI screen on the AV equipment 200 (Step ST101 in FIG. 7). Then, the user is caused to select the name of an equipment manufacturer by operating the remote controller 300 (Step ST102 in FIG. 7).

Figure 9:
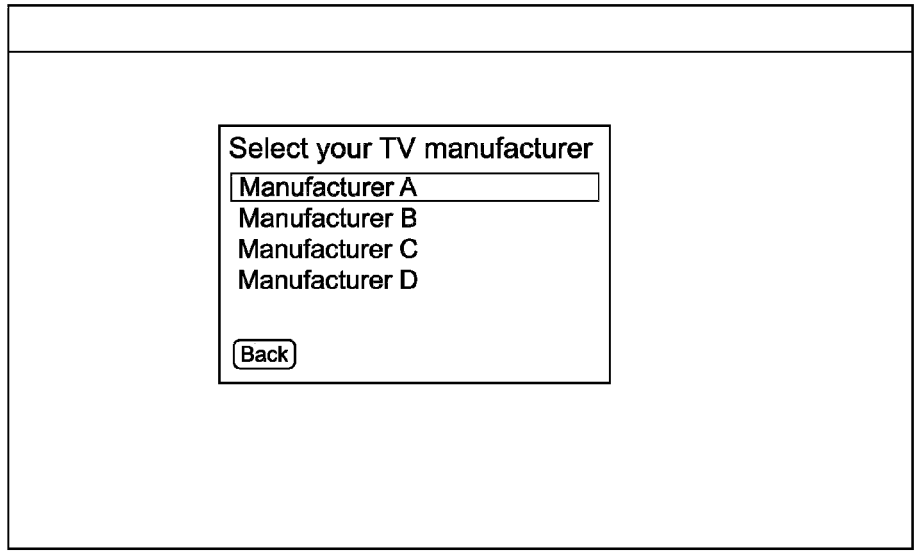
FIG. 9 is a diagram showing an equipment manufacturer selection GUI screen.

FIG. 9 is a diagram showing the equipment manufacturer selection GUI screen.

As shown in the figure, on the equipment manufacturer selection GUI screen, a plurality of equipment manufacturer names or the like are displayed. The equipment manufacturer names are manufacturer names stored in the model identification information storage unit 130, that is, manufacturer names of the manufacturers of all the AV equipment which can be selected as the setup targets of the remote controller 300. One of display items on the equipment manufacturer selection GUI screen is controlled to be in a focus state. The user shifts the display item in the focus state by operating the remote controller 300, and when the display item of a target manufacturer name is brought into the focus state, the user operates a specific key of the remote controller 300, with the result that the selection information is transmitted to the reproduction apparatus 100.

Returning to FIG. 7, when the user selects the equipment manufacturer name is selected by operating the specific key of the remote controller 300, the MCU 310 judges that the manufacturer name which is currently in the focus state is selected by the user, the MCU 310 reads model number input GUI data from the setup GUI data storage unit 120, supplies the data to the AV equipment 200 through the HDMI connection unit 150, and displays the model number input GUI screen on the AV equipment 200 (Step ST101 in FIG. 7).

Figure 10:
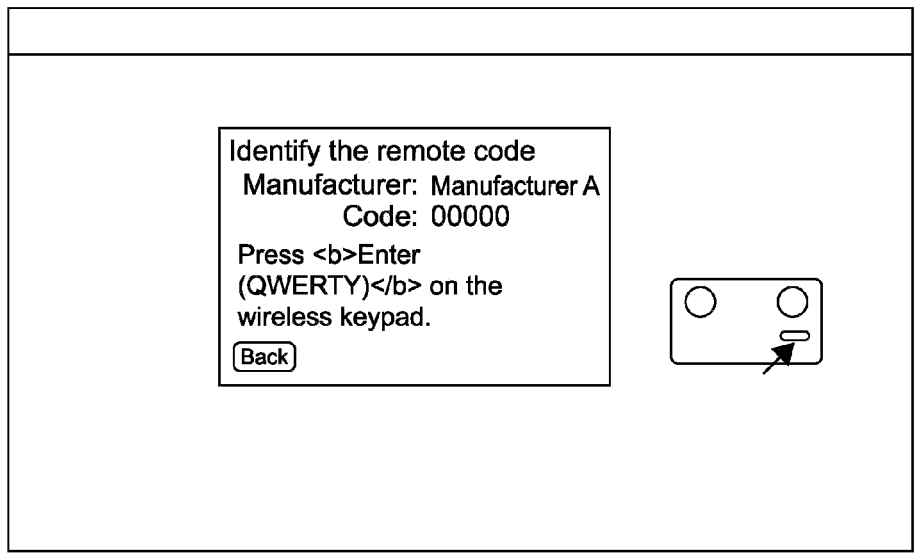
FIG. 10 is a diagram showing a model number input GUI screen.

FIG. 10 is a diagram showing the model number input GUI screen.

As shown in the figure, on the model number input GUI screen, the selected manufacturer name, a model number input box, and a guide sentence for urging a long pressing operation of the enter key 307a after the model number is input.

Each time the user uses the remote controller 300 to operate numerical keys corresponding to the model number of the AV apparatus on the model number input GUI screen, the code corresponding to the numerical keys operated is transmitted to the reproduction apparatus 100. Upon completion of the operation of the numerical keys corresponding to the model number, the user performs a long pressing of the enter key 307a (Step ST102 in FIG. 7). When receiving the code corresponding to the enter key 307a from the remote controller 300, the reproduction apparatus 100 judges a sequence of the numerical codes corresponding to the numerical keys of 1 or more which have been transmitted at that time as model number information.

When obtaining the model number information from the remote controller 300, the MCU 110 of the reproduction apparatus 100 sets a selection flag to the model identification information recorded in the model identification information storage unit 130 in association with a set of the manufacture name and the model number information notified of by the user. Then, the MCU 110 supplies the model identification information to which the selection flag is set to the remote controller 300 (Step ST103 in FIG. 7).

Here, the process of supplying the model identification information in Step ST103 will be described in more detail.

Figure 11:
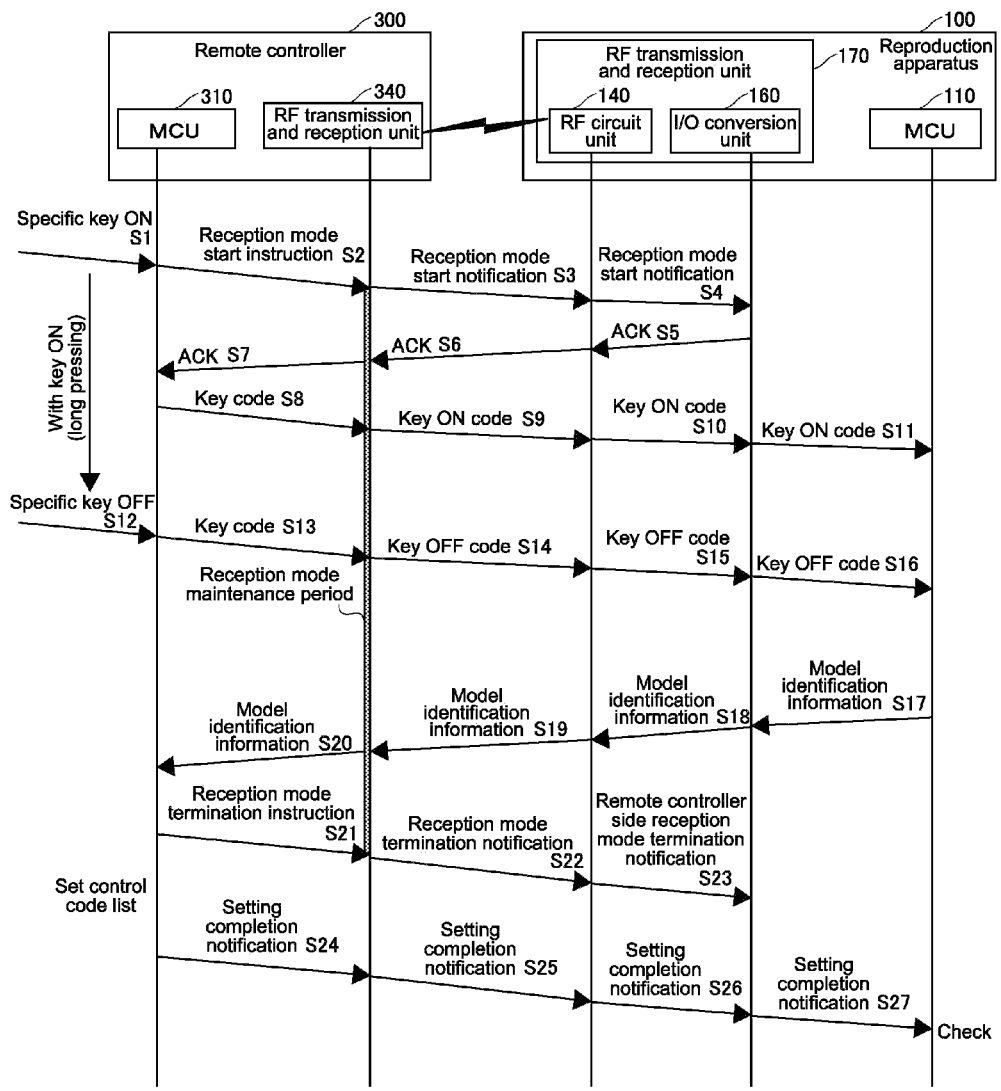
FIG. 11 is a sequence diagram showing a supply process of model identification information.

FIG. 11 is a sequence diagram showing the supply process of the model identification information from the reproduction apparatus 100 to the remote controller 300.

When judging that a time period during which an on operation (S1) of the enter key 307a is performed exceeds a predetermined time period, the MCU 310 of the remote controller 300 sets the RF transmission and reception unit 340 to a reception mode (S2). When being set to the reception mode, the RF transmission and reception unit 340 of the remote controller 300 transmits a reception mode start notification to the RF transmission and reception unit 170 of the reproduction apparatus 100 (S3).

Here, the modes of the RF transmission and reception unit 340 of the remote controller 300 will be described. The RF transmission and reception unit 340 can select one of a transmission mode and the reception mode. The RF transmission and reception unit 340 is normally set to the transmission mode. The transmission mode refers to the state in which an RF signal can be transmitted from the RF transmission and reception unit 340 of the remote controller 300. On the other hand, the reception mode refers to the state in which the RF transmission and reception unit 340 can receive the RF signal from the reproduction apparatus 100. Because the remote controller 300 is driven by a battery, the time period during which the reception unit is energized in the state where the RF transmission and reception unit 340 is set to the reception mode is minimized, which is effective to increase the use efficiency of the battery.

Returning to FIG. 11, the I/O conversion unit 160 of the reproduction apparatus 100 obtains the reception mode start notification from the remove controller 300 through the RF circuit unit 140 (S4). Upon reception of the notification, the I/O conversion unit 160 returns a response notification (ACK) to the remote controller 300 (S6) through the RF circuit unit 140 (S5). When receiving the response notification (ACK) from the reproduction apparatus 100 (S7) through the RF transmission and reception unit 340, the MCU 130 of the remote controller 300 notifies the RF transmission and reception unit 340 of the code of the enter key 307a (S8), and causes the RF transmission and reception unit 340 to notify the reproduction apparatus 100 of the fact that the enter key 307a is in the on state (long press state) (S9). The MCU 110 of the reproduction apparatus 100 receives the notification which indicates that the enter key 307a is in the on state (S11) through the RF circuit unit 140 and the I/O conversion unit 160 (S10).

When the long pressing of the enter key 307a is released (S12), the MCU 310 of the remote controller 300 notifies again the RF transmission and reception unit 340 of the code of the enter key 307a (S13), and causes RF transmission and reception unit 340 to notify the reproduction apparatus 100 of the fact that the long pressing of the enter key 307a is released (S14). The MCU 110 of the reproduction apparatus 100 receives the notification of the fact that the long pressing of the enter key 307a is released (S16) through the RF circuit unit 140 and the I/O conversion unit 160 (S15).

Subsequently, the MCU 110 of the reproduction apparatus 100 transmits the model identification information to which the selection flag is set through the I/O conversion unit 160 (S17) and the RF circuit unit 140 (S18) to the remote controller 300 (S19).

When receiving the model identification information from the reproduction apparatus 100 through the RF transmission and reception unit 340 (S20, Step ST201 in FIG. 8), the MCU 310 of the remote controller 300 causes the RF transmission and reception unit 340 to terminate the reception mode (S21) and notifies the reproduction apparatus 100 of the termination of the reception mode through the RF transmission and reception unit 340 (S22). The I/O conversion unit 160 of the reproduction apparatus 100 receives the termination notification of the reception mode from the remote controller 300 through the RF circuit unit 140 (S23).

On the other hand, when the reception mode of the RF transmission and reception unit 340 is terminated (S21), the MCU 310 of the remote controller 300 reads the control code list corresponding to the model identification information obtained from the reproduction apparatus 100 (S20) from the model identification information and control code association table storage unit 320 and assigns the control codes to the keys of the input operation unit 330 on the basis of the control code list read. As a result, the setup operation of the AV equipment 200 connected to the reproduction apparatus 100 is completed (Step ST202 in FIG. 8). Thus, the remote controller 300 becomes capable of performing the remote control of the AV equipment 200.

It should be noted that when detecting that a key other than the specific key (enter key 307a) is brought into the on state during the maintenance period of the reception mode, the MCU 310 of the remote controller 300 causes the RF transmission and reception unit 340 to terminate the reception mode (S21) and transmits the key code of the key which is turned on to the reproduction apparatus 100 through the RF transmission and reception unit 340. Further, when detecting that the specific key (enter key 307a) is released, and the specific key (enter key 307a) is brought into the on state again during the maintenance period of the reception mode, the MCU 310 of the remote controller 300 causes the RF transmission and reception unit 340 to terminate the reception mode (S21) and causes the RF transmission and reception unit 340 to start the reception mode.

(Setup Completion Check Operation)

As described above, upon completion of the setup of the remote controller 300, a check operation of the completion of the setup is performed.

With reference to FIG. 11, first, the MCU 310 of the remote controller 300 notifies the reproduction apparatus 100 of the completion of the setup (S25) through the RF transmission and reception unit 340 (S24). The MCU 110 of the reproduction apparatus 100 obtains the notification of the completion of the setup (S27) through the RF circuit unit 140 and the I/O conversion unit 160 (S26).

When obtaining the notification of the completion of the setup (S27), the MCU 110 reads setup completion check GUI data from the setup GUI data storage unit 120, supplies the data to the AV equipment 200 through the HDMI connection unit 150, and displays a setup completion check GUI screen on the AV equipment 200, to urge the user to check the completion of the setup by using the input operation unit 330 of the remote controller 300.

Figure 12:
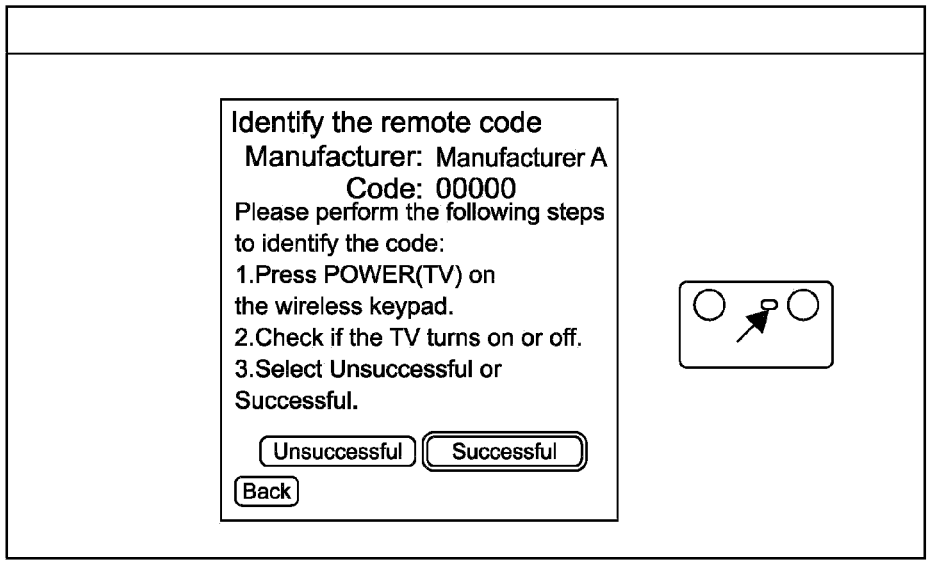
FIG. 12 is a diagram showing a setup completion check GUI screen.

FIG. 12 is a diagram showing the setup completion check GUI screen.

As shown in FIG. 12, on the setup completion check GUI screen, an instruction or the like to operate the input operation unit 330 of the remote controller 300 is displayed for the user. For example, on the setup completion check GUI screen, an instruction is displayed to check when the power supply of the AV equipment 200 is turned on or off by pressing the AV equipment power key 304 and select one of a setup success and a setup unsuccess.

When judging that the setup success is selected, the MCU 110 reads the setup completion GUI data from the setup GUI data storage unit 120, supplies the data to the AV equipment 200 through the HDMI connection unit 150, and displays a setup completion GUI screen on the AV equipment 200, thereby notifying the user of the setup completion with the use of the input operation unit 330 of the remote controller 300.

Figure 13:
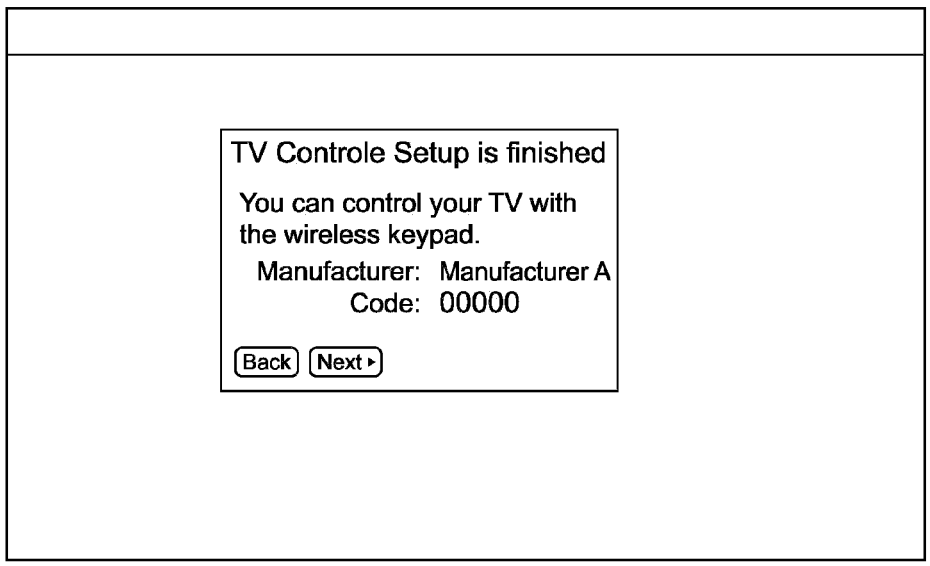
FIG. 13 is a diagram showing a setup completion GUI screen.

FIG. 13 is a diagram showing the setup completion GUI screen.

As shown in FIG. 13, on the setup completion GUI screen, a guide sentence for informing the user that the setup of the remote controller 300 is completed, and the AV equipment 200 becomes able to be controlled with the remote controller 300, an equipment manufacturer name, and an equipment code are displayed.

On the other hand, when judging that the setup unsuccess is selected, the MCU 110 reads setup unsuccess GUI data from the setup GUI data storage unit 120, supplies the data to the AV equipment 200 through the HDMI connection unit 150, and displays a setup unsuccess GUI screen on the AV equipment 200, thereby notifying the user of the setup unsuccess with the use of the input operation unit 330 of the remote controller 300 and urging the user to perform the setup again.

Figure 14:
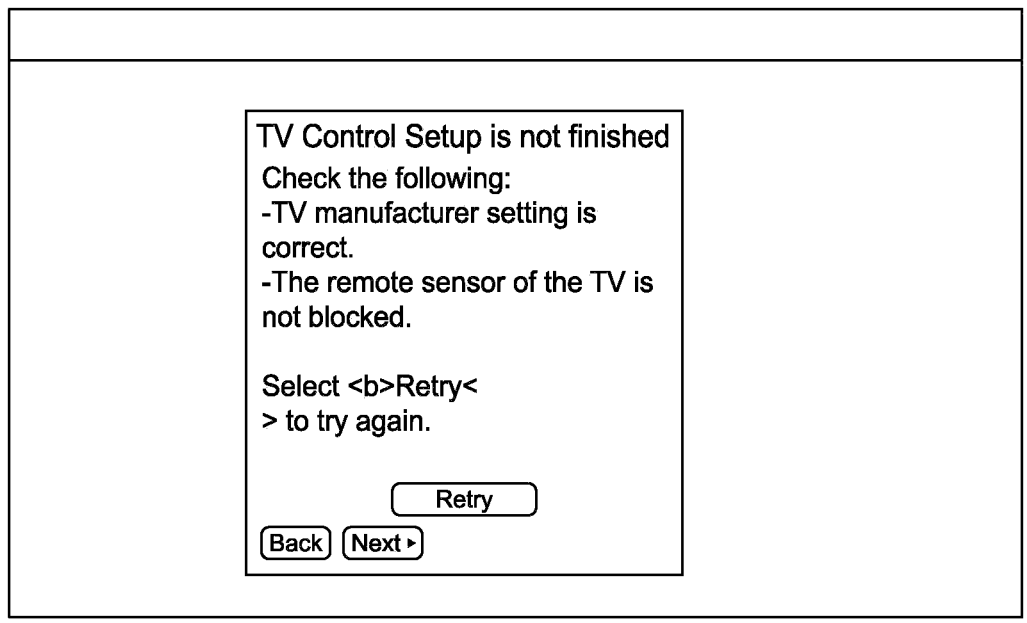
FIG. 14 is a diagram showing a setup unsuccess GUI screen.

FIG. 14 is a diagram showing the setup unsuccess GUI screen.

As shown in FIG. 14, on the setup unsuccess GUI screen, a guide sentence for informing the user that the setup of the remote controller 300 is not completed, and urging the user to check the equipment manufacturer name and the equipment code that are selected and input by the user and a guide sentence for urging the user to perform the setup again are displayed.

According to the embodiment of the present invention described above, by using the supplied remote controller 300 for controlling the reproduction apparatus 100, it is also possible to perform the remote control of the AV equipment connected with the reproduction apparatus 100. In addition, the equipment manufacturer selection GUI screen and the model number input GUI screen for leading the user to perform the operation for the setting of the remote control are displayed on the AV equipment 200. Thus, the user can select the manufacture name and input the model number while referring to the equipment manufacturer selection GUI screen and the model number input GUI screen and can easily perform the operation for the setting of the remote control.

Further, on the model number input GUI screen, the information about the operation method for selecting the model of the AV equipment 200, that is, the GUI that urges the user to perform the long pressing of the enter key 307a is included. Therefore, the user can more easily input the model while referring to the operation method.

Furthermore, the setup completion check GUI screen for urging the user to use a test method of assigning the control codes to the keys is displayed on the AV equipment 200. As a result, the user can perform the operation for checking the completion of the setup by using the remote controller while referring to the setup completion check GUI screen.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an information processing apparatus main body; and
a remote controller configured to be capable of controlling the information processing apparatus main body by communicating with the information processing apparatus main body, wherein
the information processing apparatus main body is configured to include
a connection unit capable of being connected with an electronic apparatus having a screen through a transmission line of a signal,
a first storage unit to store in advance a plurality of pieces of model identification information for identifying models of the electronic apparatus capable of being connected with the connection unit, and
a control unit to perform control so that display information of a model selection screen for causing a user to select a model of the electronic apparatus by using the remote controller is supplied to the electronic apparatus which is connected to the connection unit, the model selected by the user is determined based on a transmission signal from the remote controller, and model identification information corresponding to the model determined is transmitted to the remote controller, and
the remote controller is configured to include
a plurality of keys,
a transmission unit capable of transmitting a radio signal for controlling the electronic apparatus in accordance with an operation of the plurality of keys,
a second storage unit to store a list of control codes assigned to the plurality of keys, respectively, for each model indicated by the plurality of pieces of model identification information stored in the first storage unit of the information processing apparatus main body, and
an assignment unit to receive the model identification information transmitted from the information processing apparatus main body, read the list of the control codes corresponding to the model indicated by the received model identification information from the second storage unit, and assign the control codes to the plurality of keys, respectively,
wherein the remote controller receives the model identification information transmitted from the information processing apparatus while the remote controller is in a reception mode, and automatically terminates the reception mode upon reception of the model identification information and notifies the information processing apparatus of the termination of the reception mode.

2. The information processing apparatus according to claim 1, wherein
the display information of the model selection screen includes information about an operation method for causing the user to select the model of the electronic apparatus by using the remote controller.

3. The information processing apparatus according to claim 2, wherein
the remote controller is configured to further include a completion notification unit to notify the information processing apparatus main body of a completion of the assignment of the control codes to the plurality of keys, and
the control unit of the information processing apparatus main body supplies, upon reception of the notification, display information of an assignment check screen for urging the user to use a test method of assigning the control codes to the plurality of keys to the electronic apparatus connected to the connection unit.

4. An information processing method used by an information processing apparatus including
an information processing apparatus main body including a connection unit capable of being connected with an electronic apparatus having a screen through a transmission line of a signal, and a first storage unit to store in advance a plurality of pieces of model identification information for identifying models of the electronic apparatus capable of being connected with the connection unit, and
a remote controller capable of controlling the information processing apparatus main body by communicating with the information processing apparatus main body, the remote controller including a plurality of keys, a transmission unit capable of transmitting a radio signal for controlling the electronic apparatus in accordance with an operation of the plurality of keys, and a second storage unit to store a list of control codes assigned to the plurality of keys, respectively, for each model indicated by the plurality of pieces of model identification information stored in the first storage unit of the information processing apparatus main body, the information processing method comprising:
supplying, by the information processing apparatus main body, display information of a model selection screen for causing a user to select a model of the electronic apparatus by using the remote controller to the electronic apparatus which is connected to the connection unit;

determining, by the information processing apparatus main body, the model selected by the user based on a transmission signal from the remote controller;

transmitting, by the information processing apparatus main body, model identification information corresponding to the model determined to the remote controller; and receiving, by the remote controller, the model identification information transmitted from the information processing apparatus main body, reading the list of the control codes corresponding to the model indicated by the received model identification information from the second storage unit, and assigning the control codes to the plurality of keys, respectively, wherein the remote controller receives the model identification information transmitted from the information processing apparatus while the remote controller is in a reception mode, and automatically terminates the reception mode upon reception of the model identification information and notifies the information processing apparatus of the termination of the reception mode.

5. The information processing method according to claim 4, wherein the display information of the model selection screen includes information about an operation method for causing the user to select the model of the electronic apparatus by using the remote controller.

6. The information processing method according to claim 5, further comprising:

notifying the information processing apparatus main body of a completion of the assignment of the control codes to the plurality of keys by the remote controller; and supplying, upon reception of the notification, display information of an assignment check screen for urging the user to use a test method of assigning the control codes to the plurality of keys to the electronic apparatus connected to the connection unit by the information processing apparatus main body.

* * * * *